No. 712,565.  
T. S. MILLER.  
HOISTING AND CONVEYING APPARATUS.  
(Application filed Feb. 14, 1901.)
Patented Nov. 4, 1902.
(No Model.)
4 Sheets—Sheet 1.
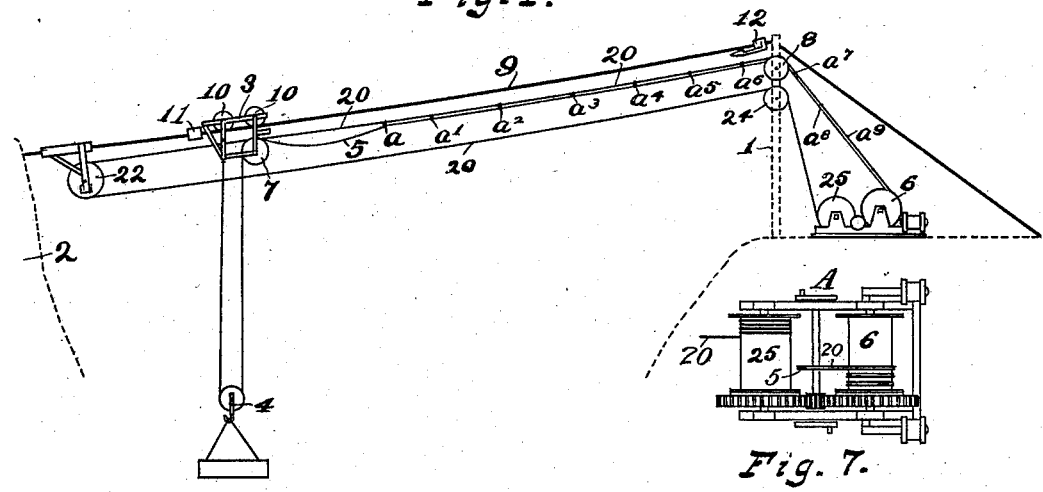
Fig. 1.
Fig. 7.
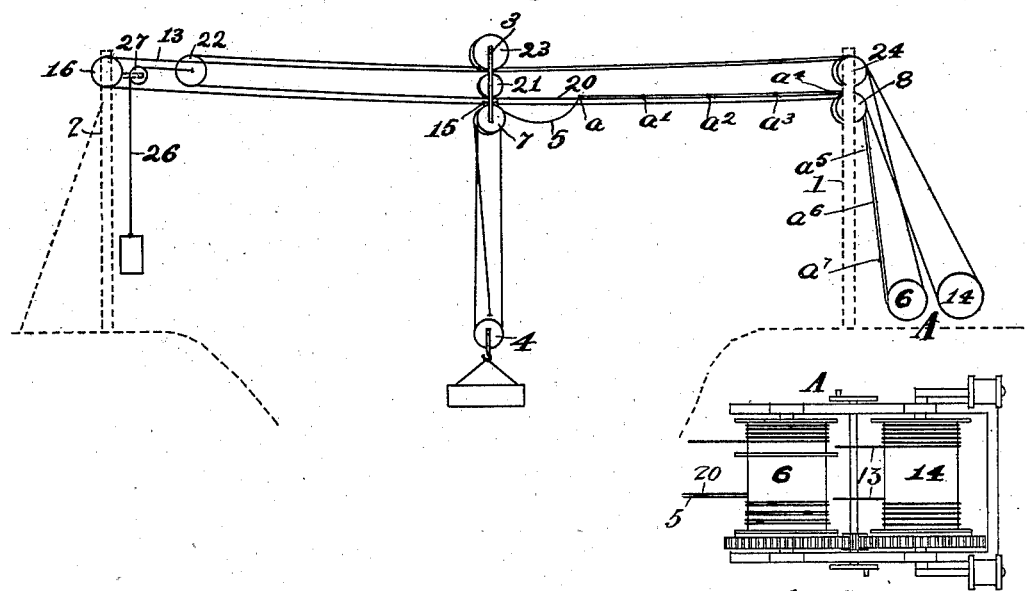
Fig. 2.
Fig. 8.
Witnesses  
Charles J. Rathjen  
George H. Hose
Inventor  
Thomas Spencer Miller.  
By his Attorneys  
Gifford & Bull.

No. 712,565.

T. S. MILLER.

HOISTING AND CONVEYING APPARATUS.

(Application filed Feb. 14, 1901.)

(No Model.)

Patented Nov. 4, 1902.

4 Sheets—Sheet 2.

Witnesses
Charles J. Rathjen
George H. Hose

Inventor
Thomas Spencer Miller.
By his Attorneys
Gifford & Bull

No. 712,565. Patented Nov. 4, 1902.
T. S. MILLER.
HOISTING AND CONVEYING APPARATUS.
(Application filed Feb. 14, 1901.)
(No Model.) 4 Sheets—Sheet 3.
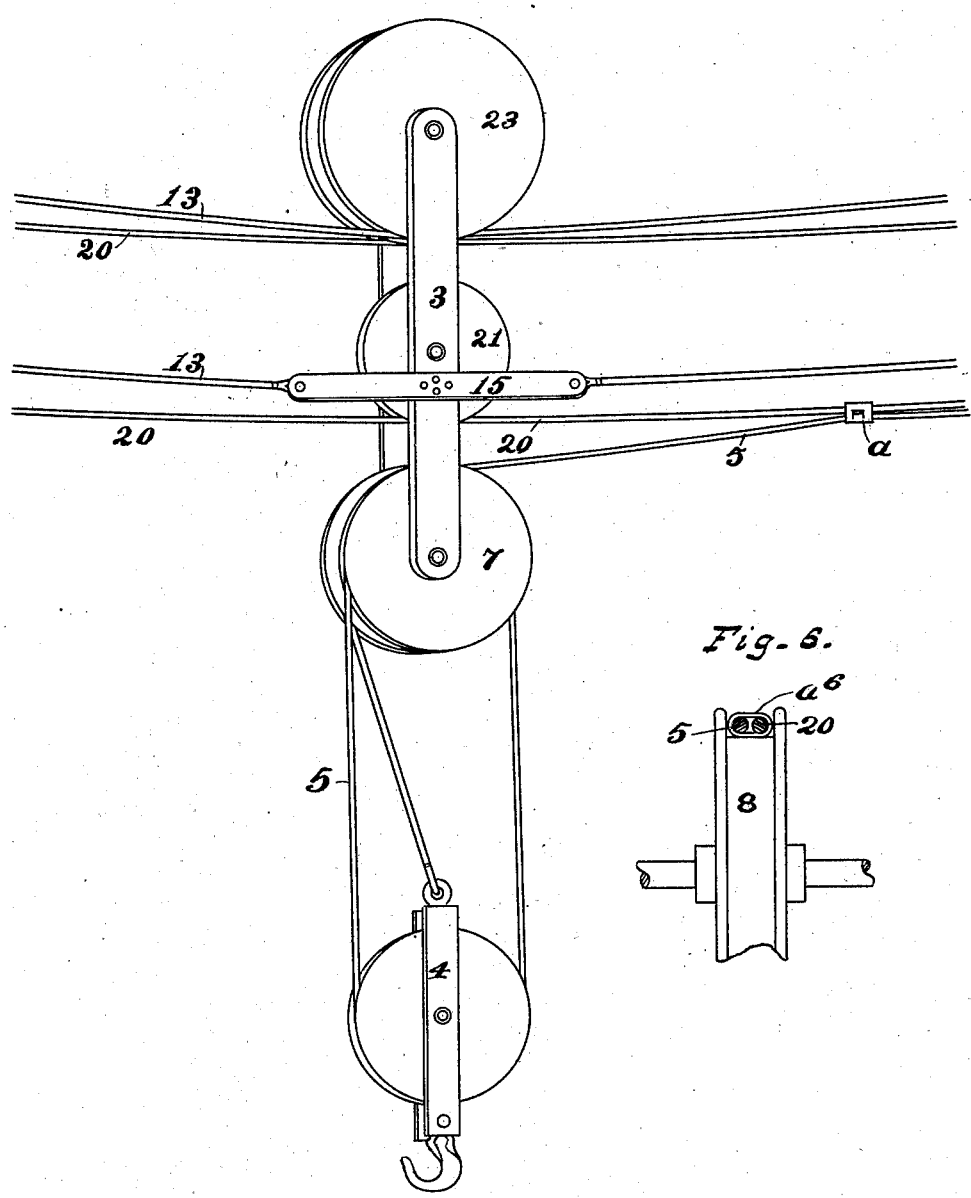

No. 712,565. Patented Nov. 4, 1902.
T. S. MILLER.
HOISTING AND CONVEYING APPARATUS.
(Application filed Feb. 14, 1901.)
(No Model.) 4 Sheets—Sheet 4.

Witnesses
Charles J. Rathjen
George H. Hose

Inventor
Thomas Spencer Miller.
By his Attorneys
Gifford & Bull.

THE NORRIS PETERS CO., PHOTO-LITHO., WASHINGTON, D. C.

UNITED STATES PATENT OFFICE.

THOMAS SPENCER MILLER, OF SOUTH ORANGE, NEW JERSEY.

HOISTING AND CONVEYING APPARATUS.

SPECIFICATION forming part of Letters Patent No. 712,565, dated November 4, 1902.

Application filed February 14, 1901. Serial No. 47,283. (No model.)

*To all whom it may concern:*

Be it known that I, THOMAS SPENCER MILLER, of South Orange, Essex county, and State of New Jersey, have invented a new and useful Improvement in Hoisting and Conveying Apparatus, of which the following is a specification.

The present invention consists of improvements on the apparatus shown in my Letters Patent of the United States numbered 434,550 and 447,892.

In the accompanying drawings, Figures 1, 2, 3, and 4 represent various forms of hoisting and conveying apparatus with my improvement applied. Fig. 5 is a detail of the load-carriage and fall shown in Fig. 2. Fig. 6 is a detail of the guiding-sheaves at the head-support with a section of the ropes passing over the same. Figs. 7 and 8 are details in plan view of the engines employed in Figs. 1 and 2, respectively. Figs. 9 to 16, inclusive, are different forms of rope-carriers, each shown in side and end views.

In describing the accompanying drawings it should be understood that they represent only preferable forms of the embodiment of my invention and that my invention may be embodied in various other forms of apparatus, even though any part of the features or elements herein described may be omitted or greatly modified.

In the accompanying drawings, 1 and 2 are the head and tail supports.

3 is the load-carriage.

4 is the fall-block.

5 is the fall-rope.

6 is the fall-rope drum.

7 is the fall-rope guide-sheave at the top of the fall.

8 is the fall-rope guide-sheave at the head-support.

Figure 3:
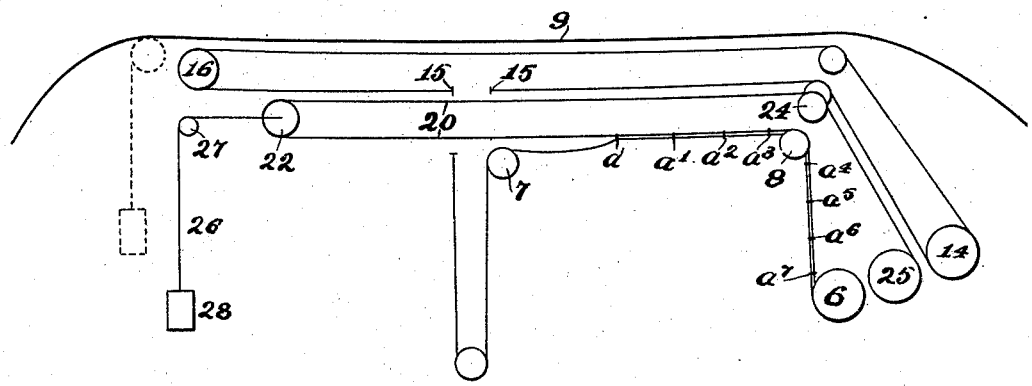
Figure 4:
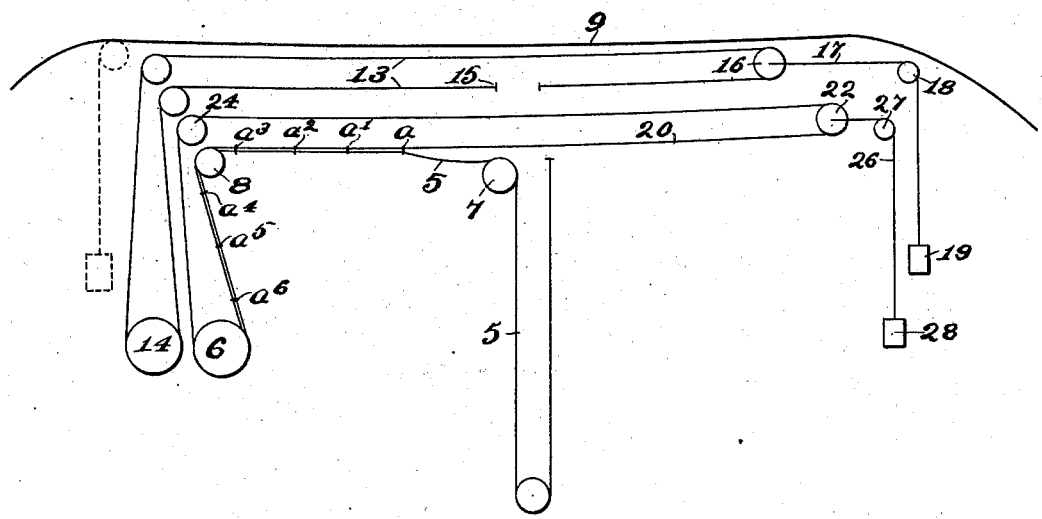
Figure 9:
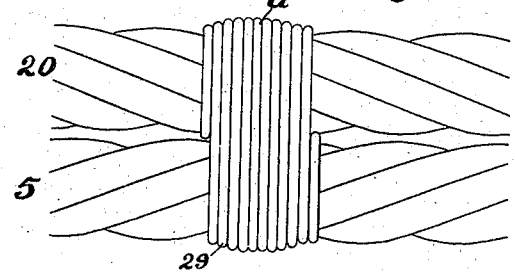
Figure 10:
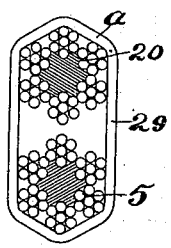
Figure 11:
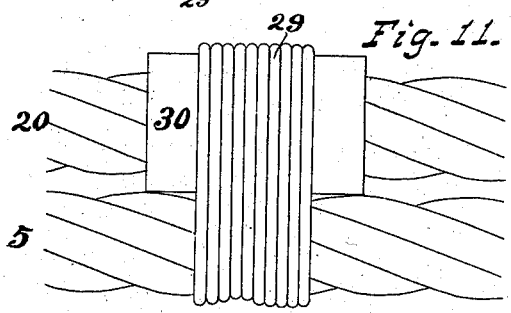
Figure 12:
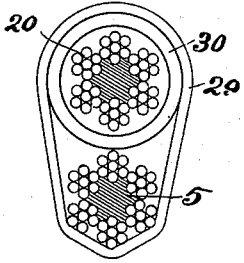
Figure 13:
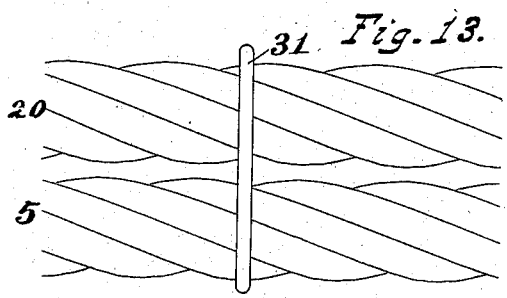
Figure 14:
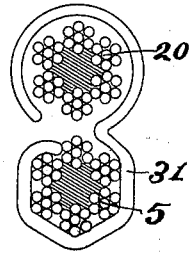
Figure 15:
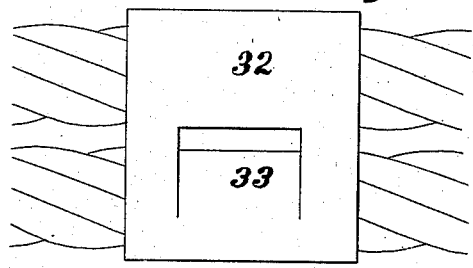
Figure 16:
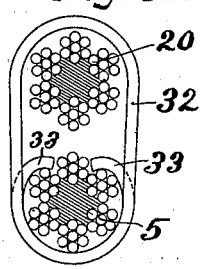

In Figs. 1, 3, and 4 the carriage runs upon a stationary trackway 9, which is preferably a cable located, as shown, above the other portions of the apparatus, so that the body of the carriage is substantially suspended below the wheel or wheels 10, which run on said cable. In Fig. 2 the carriage is shown as running on the upper branch of the traction-rope in lieu of the stationary trackway. In Fig. 1 the trackway 9 is inclined, and the outward travel of the load-carriage is caused by gravity. 11 is a block adjustably fixed to the trackway, which stops the outward travel of the load-carriage, and 12 is a hook or latch adjustably fixed to the trackway, by which the load-carriage is held near the head-support until started on its descent down the incline. In Figs. 2, 3, and 4 the trackway is substantially horizontal, and therefore in each of these figures a traction-rope 13 is employed, which, in the form shown, consists of an endless rope actuated by the traction-rope drum 14, forming part of the engine A. The two ends of the traction-rope 13 are made fast to the carriage at 15. The loop of the traction-rope near the tail-support passes around a guide-sheave 16, which in Figs. 2 and 3 is mounted directly on the tail-support, but in Fig. 4 is attached to the end of a rope 17, extending over a guide-sheave 18 on the tail-support and held taut by a suspended weight 19.

In all of the figures, 20 is what I term the "fall-rope supporting-rope." In the forms shown one end of this rope is coiled upon the fall-rope drum 6, side by side with the fall-rope 5. Thence it extends substantially parallel with the fall-rope over the head-guide sheave 8 and toward the load-carriage 3, where it and the fall-rope part company, the fall-rope passing over the guide-sheave 7 and down into the fall, but the fall-rope supporting-rope passing through or past the carriage and thence around a tail-sheave 22 and back again and over a sheave 24 on the head-support. Guide-sheaves for the rope 20, as the sheaves 21 and 23 of Figs. 2 and 5, may be mounted on the carriage, if desired, or the fall-rope sheave 7 may be made to serve as one of these sheaves, as shown in Fig. 1. In this figure the upper sheave 23 is not employed, but the return run of the rope 20 is beneath and clears the carriage. The tail-sheave 22 may be yieldingly supported—for instance, after the manner shown in Figs. 2, 3, and 4, by a weight 28 and rope 26, passing over a pulley 27, thereby producing a constant tension upon the fall-rope supporting-rope and equalizing the sag. The return end of the fall-rope supporting-rope is in Figs. 1 and 3 shown as coiled upon a take-up-rope drum 25, which is separate from the fall-rope drum and which pays out as the fall-rope drum hauls in, and vice versa. In Figs. 2 and 4 the rope-drum supporting-rope is, however, shown as substantially endless, both ends being coiled upon the fall-rope drum 6 in such manner that said drum pays out one end in unison with the fall-rope as it hauls in the other end, and vice versa. In Fig. 1 the tail-sheave 22, which acts as a tension device for the fall-rope supporting-rope, is fixed and any slack in the fall-rope supporting-rope is taken up by the operator, producing a differential motion between the rope-drums 6 and 25. In Figs. 2, 3, and 4 the tail-sheave of the fall-rope supporting-rope is connected with the end of a rope 26, which passes over a sheave 27, mounted on the tail-support and suspends a weight 28, which assists the tail-sheave in holding the fall-rope supporting-rope taut.

Some form of mechanism is still requisite for enabling the fall-rope supporting-rope to control the fall-rope, so as to prevent it from sagging on the way to the fall. In the forms shown this consists of a series of fall-rope carriers $a$, $a'$, $a^2$, $a^3$, $a^4$, $a^5$, and $a^6$, &c., extending when the fall-block is at its lowermost position from a point near the load-carriage toward the fall-rope drum and suspending the fall-rope from the fall-rope supporting-rope. These fall-rope carriers are adapted to run past the guide-sheave 8 and onto the fall-rope drum 6, so that their longitudinal spacing may remain substantially fixed as the load-carriage approaches the head-support, instead of having them congregate or collect, as in the apparatus of my patents above referred to. Moreover, in the form shown said fall-rope carriers so hold the fall-rope and its supporting-rope together that to the extent of the series of fall-rope carriers said ropes move substantially as a unit, with the exception of such allowance for relative creeping or twisting and change of relative position from vertical to horizontal, or vice versa, as is desirable.

Several forms of fall-rope carrier well adapted for the purpose of this invention are shown in Figs. 9 to 16, inclusive. The form shown in Figs. 9 and 10 consists of a wrapping 29 of wire rope, yarn, or other suitable material. The form shown in Figs. 11 and 12 contains the same wrapping; but in addition thereto a metallic thimble 30 is interposed between the wrapping 29 and the fall-rope supporting-rope 20, which thimble being loose upon the fall-rope supporting-rope permits of greater relative twisting or creeping between said ropes. The form shown in Figs. 13 and 14 consists of a single wire 31 bent substantially in the form of a figure 3 and loosely embracing one of the ropes, as the fall-rope supporting-rope 20, but tightly embracing the other rope, as the fall-rope itself. The form shown in Figs. 15 and 16 consists of a sheet-metal clip 32, bent so as to encircle the two ropes. This clip may have ears 33 stamped out of its body and bent inwardly, so as to bind upon and clamp one of the ropes. The longitudinal extent of the clip 32 will prevent any tilting upon the rope which would cause a jam, preventing the desirable freedom. When these rope-carriers are out on the span, the fall-rope 5 will hang vertically below the fall-rope supporting-rope, as shown in Figs. 9 to 16, inclusive; but when they pass over the sheave 8 and onto the fall-rope drum they will revolve around the fall-rope supporting-rope, so as to occupy the horizontal position shown in Figs. 6, 7, and 8. They hold the two ropes substantially in contact with each other, by which I mean in such proximity as that the lateral position of the fall-rope, when the fall-block is unloaded, will be substantially under the control of the fall-rope supporting-rope.

Under certain circumstances it may not be necessary to employ a plurality or series of the rope-carriers. For example, if the rope-carrier $a$ should be of sufficient strength and sufficiently fixed longitudinally to both the fall-rope and the fall-rope supporting-rope the outward travel of said supporting-rope would compel the carrier $a$ to move outwardly, and the carrier in turn would support the fall-rope against sagging by compelling the fall-rope to move outwardly, so as to prevent the fall-rope from lagging and so as to cause the fall-rope to travel forward into the fall as fast as it is paid out by its drum. I, however, prefer the series or plurality of fall-rope carriers, because not throwing any considerable strain on a single carrier and favoring of that loose fitting above described between rope and carrier which is conducive of desirable freedom for twisting and creeping.

The form of engine which I prefer is shown in Fig. 7. It consists of two friction rope-drums driven by a reversible link-motion engine. The ropes are attached to these drums, so that as the drum 6 pays out the fall-rope and supporting-rope the drum 25 hauls in the opposite end of the supporting-rope. The relative surface speed of the drums may be so regulated that the speed of this hauling in tends to slightly exceed the speed of paying out, thereby producing a slight slip of the drum friction-surfaces and insuring the continuous tautness of the fall-rope supporting-rope. In the engines shown both the series of fall-rope carriers and the fall-rope supporting-rope run onto the same rope-drum with the fall-rope, and their correlative movement, therefore, is in unison. It is presumable, however, that as soon as the principle of my invention becomes known it will suggest many other forms of embodiment wherein a device or devices of some form having a substantially predetermined motion or correlative travel with respect to the fall-rope is so combined with the fall-rope as to support the same when the fall-block is unloaded without substantially impairing the efficiency of the fall-rope or its operation. I desire to cover by this patent all forms embodying this or any other principle of my invention.

I claim—

1. In a hoisting apparatus, in combination, the fall-rope drum, the fall-rope engaging said drum and a fall-rope supporting-rope also engaging the said drum and means whereby a correlative travel is maintained between said ropes during the lowering of the fall.

2. In a hoisting apparatus, in combination, the fall-rope, a fall-rope supporting-rope, means whereby a correlative travel is maintained between said ropes during the lowering of the fall, and a plurality of fall-rope carriers connecting said ropes.

3. In a hoisting apparatus, in combination, the fall-rope, a plurality of fall-rope carriers secured to travel therewith and a fall-rope supporting-rope sustaining said carriers.

4. In a hoisting apparatus, in combination, the fall-rope, a plurality of rope-carriers secured to travel therewith, a fall-rope supporting-rope sustaining said carriers, means whereby a correlative travel is maintained between said ropes during the lowering of the fall.

5. In a hoisting apparatus, in combination, the fall-rope, two guides whereby it is supported, a fall-rope supporting-rope extending substantially parallel with said fall-rope past one of said guides, and supporting connections between said ropes adapted to freely pass said last-mentioned guide.

6. In a hoisting apparatus, in combination, the fall-rope, two guides whereby it is supported, a series of fall-rope carriers extending past one of said guides whereby it is supported between said guides, and means whereby said series of carriers is sustained to travel in correlationship with said fall-rope.

7. In a hoisting apparatus, in combination, the fall-rope, two guides whereby it is supported, a fall-rope supporting-rope whereby it is supported between said guides; both of said ropes extending beyond one of said guides to mechanism whereby they are moved correlatively in lowering the fall.

8. In a hoisting apparatus, in combination, the fall-rope drum, the fall-rope extending from said drum to the fall, a series of fall-rope carriers extending from said drum toward said fall; said series extending onto said drum with said fall-rope.

9. In a hoisting apparatus, in combination, the fall-rope drum, the fall-rope extending from said drum to the fall, a fall-rope supporting-rope extending from said drum toward said fall, said supporting-rope extending onto said drum with said fall-rope.

10. In a hoisting apparatus, in combination, the fall-rope drum, the fall-rope extending from said drum to the fall, a fall-rope supporting-rope extending from said drum toward said fall, a series of carriers connecting said ropes, said carriers and said supporting-rope extending onto said drum with said fall-rope.

11. In a hoisting apparatus, in combination, the fall-rope drum, the fall-rope extending from said drum to the fall, a fall-rope supporting-rope extending from said fall-rope drum to and beyond said fall and back again and a take-up drum which the return end of said supporting-rope engages.

12. In a hoisting apparatus, in combination, the fall-rope drum, the fall-rope extending from said drum to the fall, a fall-rope supporting-rope extending to and beyond the fall and back again and mechanism sustaining said supporting-rope so as to move correlatively with the fall-rope during the lowering of the fall.

13. In a hoisting apparatus, in combination, a fall-rope, a fall-rope supporting-rope and a fall-rope carrier connecting said ropes; said fall-rope carrier being connected with said fall-rope so as to move longitudinally in unison therewith, but permitting the twisting of one of said ropes relatively to the other.

14. In a hoisting apparatus, in combination, a fall-rope, a fall-rope supporting-rope, a fall-rope carrier which binds upon said fall-rope so as to move in unison therewith and which is revolubly engaged by said supporting-rope.

15. In a hoisting apparatus, in combination, a fall-rope, a fall-rope supporting-rope, and a series of fall-rope carriers whereby said ropes are bound together, substantially in contact.

16. In a hoisting and conveying apparatus, in combination, a load-carriage, a trackway for the same, a fall-rope, guides for the same, respectively, on said carriage and near the end of said trackway, a plurality of fall-rope carriers extending past the last-named guide.

17. In a hoisting and conveying apparatus, in combination, a load-carriage, a trackway for the same, a fall-rope, guides for the same, respectively, on said carriage and near the end of said trackway and a fall-rope supporting-rope extending substantially parallel with said fall-rope past the last-named guide.

18. In a hoisting and conveying apparatus, in combination, a load-carriage, a trackway for the same, a traction-rope for the same, a fall-rope, guides for the same, respectively, on said carriage and near the end of said trackway, a fall-rope supporting-rope extending past the last-named guide and means whereby said fall-rope and supporting-rope are moved in unison.

19. In a hoisting and conveying apparatus, in combination, a load-carriage, a trackway for the same, the head and tail supports for said trackway, a fall-rope drum, the fall-rope extending from the fall-rope drum past a guide on one of said supports to the load-carriage, a series of fall-rope carriers extending past said support toward the load-carriage, said series of carriers being supported to move correlatively with said fall-rope.

20. In a hoisting and conveying apparatus, in combination, a load-carriage, a trackway for the same, a fall-rope drum, the fall-rope extending from the fall-rope drum to the load-carriage, a series of fall-rope carriers extending from said drum toward the load-carriage; said series of fall-rope carriers extending onto said drum with said fall-rope.

21. In a hoisting and conveying apparatus, in combination, a load-carriage, a trackway for the same, a fall-rope drum, the fall-rope extending from the fall-rope drum to the carriage, a fall-rope supporting-rope extending from said drum toward said carriage and a series of carriers connecting said ropes; said supporting-rope and series of carriers extending onto said drum with said fall-rope.

22. In a hoisting apparatus, in combination, the fall-rope, a fall-rope supporting-rope, means whereby the movement of said fall-rope supporting-rope is controlled relatively to the paying out of the fall-rope and mechanism whereby the weight of said fall-rope is communicated to said fall-rope supporting-rope, at intervals throughout its length.

23. In a hoisting apparatus, in combination, a fall-rope, a fall-rope drum to which said fall-rope extends, a fall-rope supporting-rope distinct from the fall-rope supporting-rope and movable in harmony therewith, means whereby the fall-rope supporting-rope is held taut independently of the fall-rope and mechanism whereby the weight of said fall-rope is communicated to said fall-rope supporting-rope.

24. In a hoisting apparatus, in combination, a fall-rope, a fall-rope drum engaging therewith, a fall-rope supporting-rope extending outward and back and a carrier connecting the fall-rope and supporting-rope and having a substantially-fixed position longitudinally on both during the lowering of the fall.

25. In a hoisting and conveying apparatus, in combination, a load-carriage, a trackway for the same, a fall-rope, a guide for the same near the end of said trackway, a fall-rope drum, a fall-rope supporting-rope extending outward and back, and a carrier which connects the fall-rope and supporting-rope and has a substantially fixed position longitudinally on both while it is moving outward on the span.

26. In a hoisting apparatus the combination with a fall-rope and a fall-rope supporting-rope, of connections moving with said ropes and preventing separation of that portion of the fall-rope not consumed in the fall from its supporting-rope, but otherwise permitting their free relative movement.

THOMAS SPENCER MILLER.

Witnesses:
H. L. REYNOLDS,
GEORGE H. HOSE.